(12) United States Patent
Horgan

(10) Patent No.: US 7,963,255 B2
(45) Date of Patent: Jun. 21, 2011

(54) MOTION CONTROL HARNESS FOR A MEDIUM TO VERY LARGE DOG

(76) Inventor: Jason Horgan, Pembroke Pines, FL (US)

( * ) Notice: Subject to any disclaimer, the term of this patent is extended or adjusted under 35 U.S.C. 154(b) by 42 days.

(21) Appl. No.: 12/620,814

(22) Filed: Nov. 18, 2009

(65) Prior Publication Data

US 2010/0122667 A1  May 20, 2010

Related U.S. Application Data

(60) Provisional application No. 61/115,702, filed on Nov. 18, 2008.

(51) Int. Cl.
*A01K 27/00* (2006.01)
*A01K 15/04* (2006.01)

(52) U.S. Cl. .......................... 119/792; 119/816

(58) Field of Classification Search .............. 119/726, 119/792, 810, 814, 816, 817, 818; 54/71
See application file for complete search history.

(56) References Cited

U.S. PATENT DOCUMENTS

| | | | |
|---|---|---|---|
| 78,082 A * | 5/1868 | Gray | 54/71 |
| 1,084,169 A * | 1/1914 | Russell | 54/71 |
| 2,534,727 A | 8/1949 | Moyle | |
| 3,994,264 A | 11/1976 | Flynt | |
| 4,528,944 A * | 7/1985 | Reed et al. | 119/702 |
| 5,845,606 A * | 12/1998 | Hartman | 119/856 |
| 6,354,247 B1 | 3/2002 | Andrews | |
| 6,708,650 B1 * | 3/2004 | Yates | 119/792 |
| 7,131,400 B2 * | 11/2006 | Wanveer et al. | 119/792 |
| 7,150,248 B2 * | 12/2006 | Hodl | 119/818 |
| 7,284,504 B1 * | 10/2007 | Purschwitz et al. | 119/792 |
| 2007/0028568 A1* | 2/2007 | Diaz | 54/71 |
| 2008/0250761 A1* | 10/2008 | Bentley | 54/71 |

* cited by examiner

*Primary Examiner* — Kimberly S Smith
*Assistant Examiner* — Monica Williams
(74) *Attorney, Agent, or Firm* — Malin Haley DiMaggio Bowen & Lhota, P.A.

(57) ABSTRACT

A restraint harness for a dog, particularly a dog of medium size and larger, including a conventional adjustable dog harness and an attached harness control extension. The harness control extension includes a plurality of straps configured to extend to the hind end of the dog and a motion control cord that is interlaced in and between the conventional adjustable dog harness and the harness control extension. The motion control cord encircles the dog's hind legs and can be tightened around the thighs with minimal force, where such tightening substantially restrains the dog without causing injury to the dog.

19 Claims, 2 Drawing Sheets

MOTION CONTROL HARNESS FOR A MEDIUM TO VERY LARGE DOG

This application claims the benefit of prior provisional application Ser. No. 61/115,702.

BACKGROUND OF THE INVENTION

1. Field of the Invention

This invention relates generally to a harness for a medium to large dog, and specifically to a motion control harness for a medium to large dog that allows the operator to inhibit the movement or motion of medium to large dogs when desired.

2. Description of Related Art

It is quite customary for a dog owner to use a harness or leash when walking for their dog. Conventionally dog harnesses and leashes have been made to allow the user to walk with the dog and control the movement of the dog so that the dog cannot get away or be subject to danger from automobile traffic. It is also desirable, for safety purposes, to be able to control the dog in the instance where other people or animals are present to prevent any type of undesired interaction. Unfortunately, when it comes to walking a medium to large dog, the dog can be overpowering. A conventional harness, which is usually around the front chest and upper body portion of the dog is not sufficient. Even with the strongest of harnesses and leashes it may get to the point where the dog owner is unable to control the dog's movement. The hind leg muscles, which provide the majority of the pulling power in medium to large dogs are very strong. In such a circumstance it can be very dangerous for a dog owner to walk a medium to larger dog that can literally over power the person holding the leash or harness.

There have been many attempts to provide control over dogs in the past. For example, there are apparatuses on the market that control a dog by being positioned on the dog's face. Many dogs, however, resist wearing them due to facial discomfort. U.S. Pat. No. 6,354,247, issued to Andrews on Mar. 12, 2002, describes a method and apparatus for controlling an animal. The front harness includes a pair of loops that go around the lower portion of a dog's hind legs to control the dog's actions. Because of the loop relationship with the cord and harness and the loop position on the dog's legs, it is the Applicant's position that this device does not properly control a medium to large animal. First, the loops below the hocks (ankles) will not control the animal because the main muscles used for power are located in the upper thigh region (quadriceps/hamstrings). Second, loops around the hock(ankle) are dangerous to the animal as the animal can become tied up and injure its legs. Third, due to the change in distance between the loops and their connection on the harness during the dog's stride, the loops will have a tendency to loosen and fall off the leg. Finally, the direction to which pressure is applied to the hock(ankle) is not natural and can lead to joint, muscle, and bone injury. U.S. Pat. No. 3,994,264, issued to Flynt on Nov. 30, 1976, shows a dog restraining harness. U.S. Pat. No. 3,994,264 is a jump restraint not a walking control device. U.S. Pat. No. 2,534,727 is another attempt at restraint for a dog. It is not motion controlled. The harness is not dynamic. The owner has to stop the dog and adjust the straps. Furthermore, the device limits the dog's stride even if the dog slows down or stops pulling unless it is re-adjusted manually. Again the harness shown does not properly control the animal especially for a medium to large dog.

The Applicant's invention described herein includes a motion control cord with a loop and that is fastened to a complete body harness. The cord/loop engages particular hind leg muscles(quadriceps, hamstrings, etc.) of medium to large dogs. When tightened around the dog's leg muscles the cord/loop apparatus resists movement so that the dog is not able to pull or charge away from the person holding the restraint cord. The cord also distracts the dog's attention by creating an awkward sensation around the main muscles of power (quadriceps and the like) so that they lose focus on whatever caused them to pull initially. The apparatus works by transferring the energy the dog uses to pull into tightening the loops around the thigh muscles which result in restraint of the dog. By encircling large muscle groups(quadriceps, hamstrings, etc.) there is no risk of injury to the dog's legs.

SUMMARY OF THE INVENTION

A restraint harness for a dog, particularly a dog of medium size and larger, including a conventional adjustable dog harness and an attached harness control extension. A conventional adjustable dog harness typically includes an adjustable body encircling strap for the front torso of the dog and a second perpendicular strap that can engage the front chest of the dog, connected at each end to the front torso strap.

Attached to the dog harness is the harness control extension, comprising a center line strap connected by a fastener to the body encircling strap that is disposed along the spine of the dog from a front portion of the animal to the rear hind portion of the animal. The center line strap has a pair of adjustable lateral straps connected to the center line strap at the rear hind portion of the dog. Each of the lateral straps includes an "O" ring rigidly fastened to the end of them.

The front harness also has a left and right "O" ring attached on each side by side snap hooks that are used in conjunction with a motion control or restraint cord which is interlaced into and between the dog harness and the harness control extension.

The motion control cord is attached at one end to one "O" ring of the lateral strap on each side. The control cord is then formed in a pair of loops that are large enough to engage the hind legs of the dog. The cord passes back through the "O" ring on each lateral strap on each side. Thus, the control cord has a pair of retractable loops that can be made quite small in diameter by pulling on the control member. Pulling on the control member causes tightening of the loops that encircle the upper hind leg muscles of the dog. In addition, the control cord will pass through the "O" ring that is attached to the front harness of the dog on each side. Finally, the control cord will then extend far enough above the animal into the control member. The operator of the control harness can potentially walk with the dog at a walking pace with sufficient grip on the control member. The opperator's hand engages the control member while walking the dog. The control cord can be somewhat like a leash as the sole restraint. The owner can also attach a leash to the front harness of the dog if trying to train the dog to walk on a regular leash or conventional harness eventually without the control cord.

The main purpose of the control cord is that if a medium to large dog tries to charge or run, the forward motion will cause the control cord that is firmly held by the operator to squeeze the upper leg muscle of the dog on each side (right leg and left leg) which will restrain the leg muscles and prevent the dog from moving forward. This action happens quite quickly by pulling on the control cord or by the dog attempting to pull away from the operator who is firmly holding the control cord.

The Applicant has found that the control cord is very effective for stopping a medium to large dog from pulling because that the control cord restrains the upper muscles of the dog's legs preventing the dog from moving forward. The force and direction of the control cord is also comfortably controlled by the fact that the forward harness includes "O" rings that redirect the direction of the control cord from the rear legs to the front harness to the operator holding the control member well above the dog.

An object of this invention is to provide a dog control harness to prevent the animal from charging another person or animal, while not risking injuring to the dog.

It is another object of this invention to provide an animal harness especially suited for medium to large dogs that can restrain the dog's rear leg muscles so that the operator can restrain the dog from undesired movement during an operation such as walking the dog. Another objective of this invention is to be used as a training tool with a regular leash attached to the front harness in hopes of eventually removing the control cord.

PREFERRED EMBODIMENT OF THE INVENTION

Figure 1:
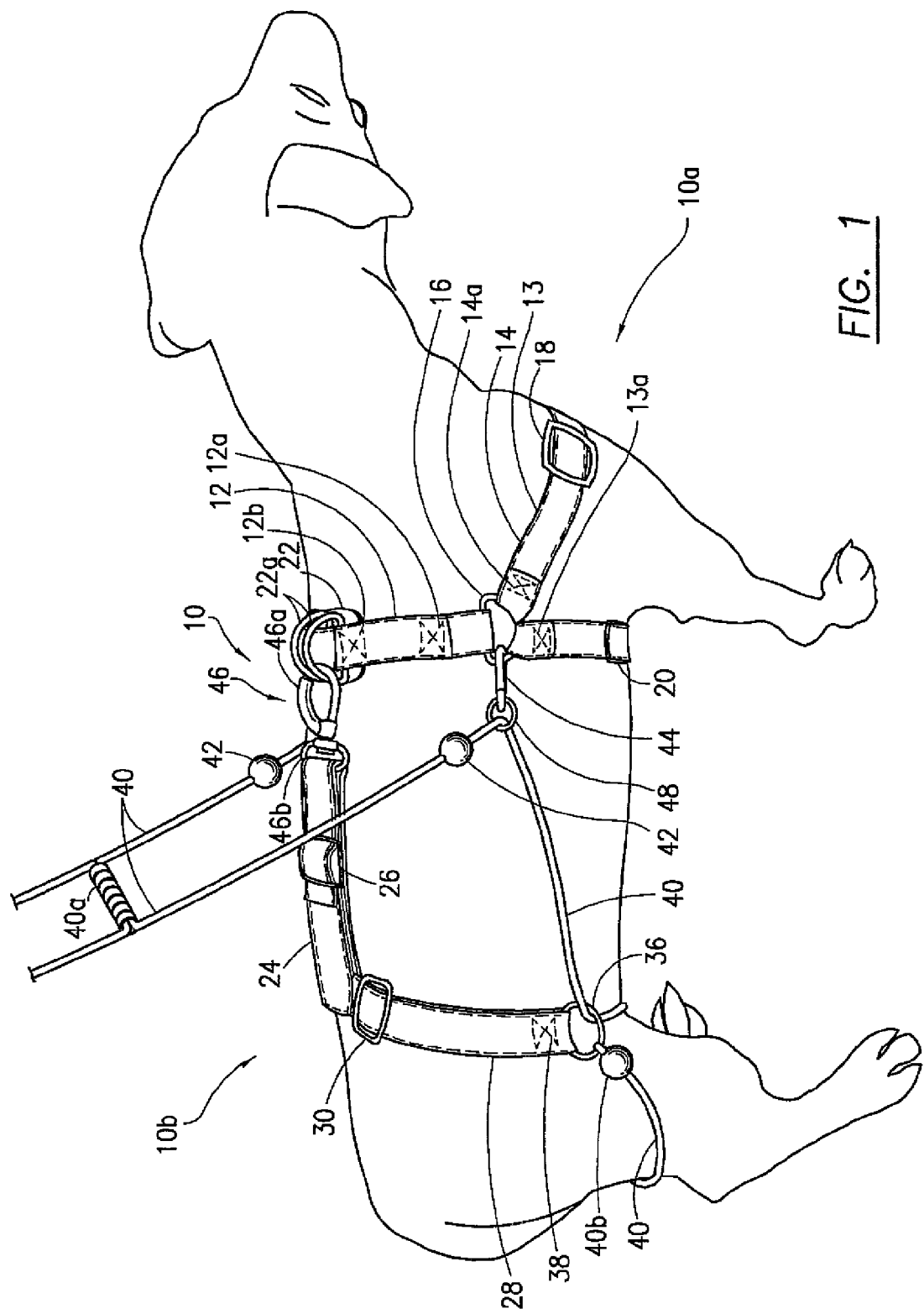
FIG. 1 shows a perspective view of one embodiment of the present invention.
Figure 2:
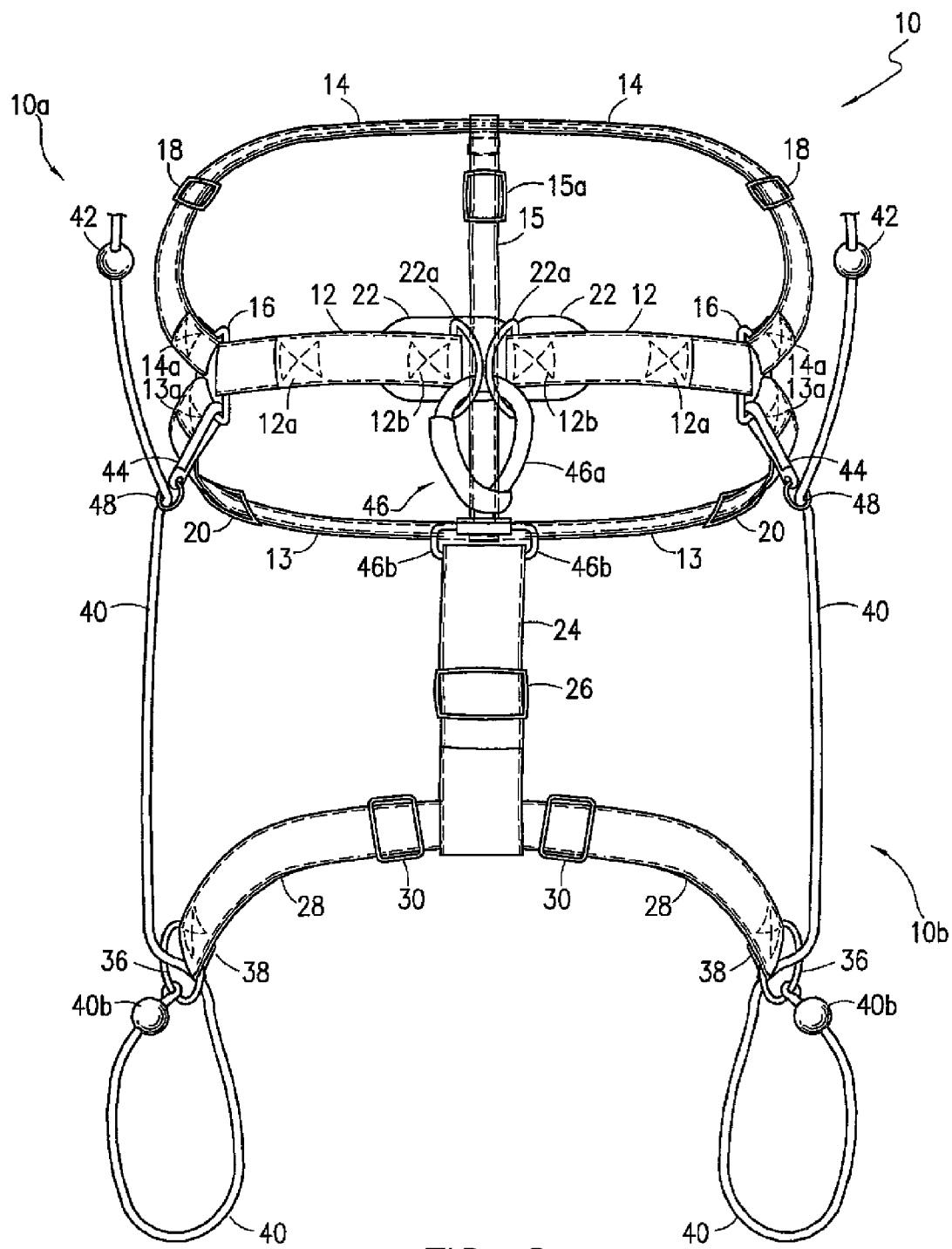
FIG. 2 shows a top plan view of the harness as shown in FIG. 1.

Referring now to the drawings and in particular FIGS. 1 and 2, a control harness 10 is shown. Particularly, FIG. 1 shows the control harness 10 attached to a representation of a large dog while FIG. 2 shows a more complete view. The control harness 10 is the combination of a conventional adjustable dog harness 10a, which is well known in the art, and a control extension 10b that is attached to the dog harness 10a. Two side cords are a part of and extend from the control extension 10b to an undetermined length, and provide the primary restraining action. A control member 40a, through which the proximal ends of the two side cords 40 pass, provides a handle for the user 40a.

The control harness 10 is comprised of several narrow thin but very strong straps preferably made of an artificial fabric such as nylon. Nylon straps are extremely strong and have a lot of holding power and are desirable because of their light weight and flexibility. In addition, this material allows the control harness 10 to be machine washable. The dog harness 10a includes two body torso straps 12 which are made up of two identical narrow rectangular nylon straps on opposite sides of the dog that are each connected to a "D" ring 16 at one end with a loop 12a that is sewn into the strap 12. At the opposite end of the "D" ring 16, the straps 12 have opposing male/female ends of a plastic fastener 22, where the ends can engage to lock the straps 12 together at the middle of the dog's back. Above the plastic fastener 22, each strap 12 has another "D" ring 22a, and each strap 12 is also attached to the "D" ring 22a with a loop 12b that is sewn into the strap 12. Only one of the straps 12 is visible in FIG. 1, but the opposing strap 12 is identical in the way it connects to the "D" ring 16, the plastic fastener 22, and the "D" ring 22a. The straps 12 proceed up to the upper portion of the dog's back and are fastened together in the middle of the dog's back when the ends of the plastic fastener 22 are engaged together. The "D" ring 16 connects the straps 12 covering the sides and back of the dog to with an encircling strap 13 that, when connected to the straps by way of the "D" ring 16, encircle the dog by running to the rear of the dog's front legs and across the dog's chest. The encircling strap 13 is attached to the "D" ring 16 with a loop 13a that is sewn into the encircling strap 13. The end of the encircling strap 13 not shown in FIG. 1. A front chest strap 14 is also connected at one end to the "D" ring 16 and proceeds around to the left side of the dog in front of the dog's front legs and similar connection and "D" ring 16 as shown in FIG. 1. The chest strap is attached to the "D" ring 16 with a loop 14a that is sewn into the chest strap 14. An under strap 15 runs under the dog's chest from the chest strap 14 to the encircling strap 13. The under strap 15 is adjustable with a buckle 15a. The straps 12, 13, 14, and 15 represent basically a conventional harness. This harness is adjustable with buckles 18 and 20 for different size dogs so that it can fit comfortably yet be tight enough for the dog not to be able to get out of the straps.

To attach the control extension 10b to the dog harness 10a, an "O" clip 46 is attached to the center strap 24 of the control extension 10b is attached to the "D" rings 22a at the mid-section along the dog's spine area. The "O" clip 46 has a front area 46a with a circular snap hook that is attached to a rear area 46b that allows a strap to be laced into it. The center strap 24 is positioned along the mid-spinal portion of the animal from its upper-mid back to its rear hind back and is adjustable in length with a buckle 26. In addition, on each side of the dog, a side snap hook 44 attaches to the "D" ring 16.

The center strap 24 terminates near the rear of the dog into lateral straps 28, which are affixed perpendicular to the end of strap 24 and overlaps on each side of the dog's back terminating on each side in an "O" ring 36. Thus, the lateral straps 28 extend from each side of strap 24 down to each side of the dog. The lateral straps 28 are adjustable in length by using a buckle 30, where one buckle 30 is located on the lateral straps on each side of the strap 24, to accommodate different size dogs.

Attached on each end of the lateral straps 28 are "O" rings 36, the lateral straps 28 pass through the "O" rings 36 and fold back onto themselves, where they are firmly attached by threads 38 that are sewn into the lateral straps 28. This creates a permanent attachment of the "O" rings 36. The lateral straps 28 shown in FIG. 1 appear on the left side of the dog in an identical manner.

Two very strong but light weight side cords 40 are attached on each side of the control harness 10. Each side cord 40 begins at the "O" ring 36, where it is permanently connected by having the end of the side cord 40 looped around the "O" ring 36 and locked in position by a permanent cord stop 40b. The side cord 40 then passes to the rear of the dog's hind legs and then completely around the dog's hind legs, where it passes through the "O" ring 36 and fed up to and through "O" ring 48 that is attached to the side snap hook 44. The cord fastenings are the same on both sides of the dog as shown in FIG. 1 and FIG. 2. An adjustable cord stop 42 is positioned near "O" ring 48 to control how much the side cord 40 passes through "O" ring 48 towards the hind end of the dog. If too much side cord 48 is available, the control harness would be too loose on the dog. If too little side cord 40 is available, the control harness would effectively be constantly engaged and the dog would be met with constant resistance when trying to move its hind legs. Therefore, the adjustable cord stop allows the user to adjust how much side cord 40 is available below the "O" ring 48.

Once the side cords 40 are passed through the "O" ring 48 they continue towards the user and the control member 40a. The side cords 40 engage the control member 40a by each entering opposing ends of the control member 40a, passing each other in opposite directions inside the control member 40a, and each exiting the end from with the opposite side cord 40 entered the control member 40a.

The side cord 40, the lateral straps 28, and the "O" ring 36 are strategically positioned to ensure the side cord 40 encircles the upper hind leg muscles of the dog. The side cord 40 is in such a position around the upper hind leg muscles of the dog that it can restrain these muscles when less side cord 40 is made available to the control extension 10*b*, which forces the loops created by the side cord 40 that are around the hind legs to get smaller and smaller. The user would make less side cord 40 available by pulling the control member 40*a*, which acts to pull both side cords 40 simultaneously. The end of each side cord 40 that exits the control member 40*a* can be used to adjust the height of the control member 40*a* above the dog by adjusting the position of the control member 40*a* on the side cords 40. The operator can decrease the height of the control member 40*a* by pulling on the end of each side cord 40 where it exits the control member, thereby lessening the length of each side cord 40 below the control member 40*a*. The operator can increase the height of the control member 40*a* by pulling on the end of each side cord 40 where it enters the control member 40*a*, thereby increasing the length of each side cord 40 below the control member 40*a*. Once the control member 40 is adjusted to the comfortable height for the user, the position can be secured by tying the end of each side cord 40 where it exits the control member 40*a* is tied into a square knot with the adjacent side cord 40 that is entering the control member 40*a*. The user can readjust the height of the control member 40*a* by untying and adjusting the position of the control member 40*a* on the side cords 40.

The upper spine strap 24 and the lateral straps 28 are adjustable in length for fitting a specific size dog. The device could be used with another conventional leash that could be attached to the front harness portion through "D" rings 22*a*. This means that the operator walking the dog could pull and direct the dog using the leash through the "D" rings 22*a* and at the same time holding the control member 40*a*. If the dog were to jump forward or lunge forward, the operator could pull the control member 40*a* or allow the motion of the dog lunging forward to cause a reduction in the size of the loop around the dog's legs, restraining the dog's muscles. The control extension 10*b* can be easily removed by disengaging the "O" clip 46 and the side snap hooks 44 from the dog harness. It is noted that if the operator pulls on the control member 40*a* behind the dog, the dog will often walk backwards toward the operator.

The instant invention has been shown and described herein in what is considered to be the most practical and preferred embodiment. It is recognized, however, that departures may be made from within the scope of the invention and that obvious modifications will occur to a person skilled in the art.

What is claimed is:

1. A control harness comprising:
an adjustable dog body harness that can be positioned on a dog, said body harness having a first harness strap, a second harness strap, a left strap connection point and a right strap connection point, where said first harness strap is connected to said second harness strap at the left strap connection point and the right strap connection point, wherein when said harness is positioned on a dog, said first harness strap is positioned perpendicular to the dog's spine and encircles the dog's torso by running around the dog's back and around the dog's chest behind the dog's front legs, said second harness strap is positioned perpendicular to the first harness strap and runs across the dog's chest in front of the dog's front legs, and said left strap connection point and said right strap connection point are positioned on the left and right side of the dog, respectively, above the dog's front legs;

a harness extension member and an extension intersection, where said harness extension member is connected to said body harness, said harness extension member having a first extension strap, a second extension strap, and a control cord, said first extension strap being perpendicular to the second extension strap and said first extension strap connected to said second extension strap at the extension intersection;

an extension attachment point, where said first extension strap is coupled to the first harness strap at the extension attachment point and said first extension strap extending along the dog's back parallel with the dog's spine from the first extension attachment point to the extension intersection;

a left hind connector and a right hind connector, where said second extension strap is positioned perpendicular with the dog's spine extending from the left hind connector at the left thigh portion of the dog's hind leg through the extension intersection and to the right hind connector at the right thigh portion of the dog's hind leg;

a left cord section and a right cord section, where the control cord has the left cord section and the right cord section;

a left cord connector, where the distal end of said left cord section is attached to the left hind connector, extending from the left cord connector encircling the dog's left hind leg, re-engaging and passing through said left hind connector, and extending to and engaging with the left cord connector attached to the left strap connection point, and the proximal end of said left cord section extends away from the left cord connector;

wherein when force away from the dog is exerted on the proximal end of said left cord section, inward pressure is exerted on the section of the left cord section encircling the dog's left hind leg;

a right cord connector where the distal end of said right cord section is attached to the right hind connector, extending from the right cord connector encircling the dog's right hind leg, re-engaging and passing said right hind connector, and extending to and engaging with the right cord connector attached to the right strap connection point, and the proximal end of said right cord section extends away from the right cord connector; and wherein when force away from the dog is exerted on the proximal end of said right cord section, inward pressure is exerted on the section of the right cord section encircling the dog's right hind leg.

2. The control harness of claim 1, additionally comprising a cord control member, wherein said cord control member is a hollow cylindrical body and the proximal end of said left cord section and said right cord section pass through the hollow body, said cord control member providing a pivot from which directional force can be exerted on the left cord section and the right cord section simultaneously.

3. The control harness of claim 1, wherein said first extension strap uses a snap hook to removably engage the first harness strap at the extension attachment point.

4. The control harness of claim 1, wherein said left hind connector is a circular ring apparatus, said distal end of the left cord section is permanently affixed to said left hind connector, and said left cord section re-engages said left hind connector by passing through the left hind connector circular ring.

5. The control harness of claim 1, wherein said right hind connector is a circular ring apparatus, said distal end of the right cord section is permanently affixed to said right hind connector, and said right cord section re-engages said right hind connector by passing through the right hind connector circular ring.

6. The control harness of claim 1, wherein said left cord connector comprises a snap hook attached to a circular ring apparatus, wherein the left cord connector is removably attached to the left strap connection point with the left cord connector snap hook and the left cord section engages said left cord connector by passing through the left cord connector circular ring.

7. The control harness of claim 1, wherein said right cord connector comprises a snap hook attached to a circular ring apparatus, wherein the right cord connector is removably attached to the right strap connection point with the right cord connector snap hook and the right cord section engages said right cord connector by passing through the right cord connector circular ring.

8. The control harness of claim 1, additionally comprising a left stopper, wherein the left stopper is engaged on the left cord section on the proximal side of the left cord connector, said left stopper being incapable of passing through the left cord connector, where the user can manually adjust the position of said left stopper along the left cord section on the proximal side of the left cord connector.

9. The control harness of claim 1, additionally comprising a right stopper, wherein the right stopper is engaged on the right cord section on the proximal side of the right cord connector, said right stopper being incapable of passing through the right cord connector, where the user can manually adjust the position of said right stopper along the right cord section on the proximal side of the right cord connector.

10. A dog harness control extension comprising:
a harness extension member connectable to a dog harness, said extension member having a first extension strap, a second extension strap, an extension intersection and a control cord, where the first extension strap is connected to the second extension strap at the extension intersection, said first extension strap being perpendicular to the second extension strap;
an extension attachment point, where said first extension strap being attachable to the dog harness at the extension attachment point and said first extension strap extending along the dog's back parallel with the dog's spine from the first extension attachment point to the extension intersection;
a left hind connector and a right hind connector, where said second extension strap being positioned perpendicular with the dog's spine extending from the left hind connector at the left thigh portion of the dog's hind leg through the extension intersection and to the right hind connector at the right thigh portion of the dog's hind leg;
a left cord section and a right cord section, said control cord having the left cord section and the right cord section;
a left cord connector, where the distal end of said left cord section is attached to the left hind connector, extending from the left cord connector encircling the dog's left hind leg, re-engaging and passing said left hind connector, and extending to and engaging with a left cord connector attachable to the left side of a dog harness, and the proximal end of said left cord section extends away from the left cord connector;
wherein when force away from the dog is exerted on the proximal end of said left cord section, inward pressure is exerted on the section of the left cord section encircling the dog's left hind leg;
a right cord connector, where the distal end of said right cord section is attached to the right hind connector, extending from the right cord connector encircling the dog's right hind leg, re-engaging and passing said right hind connector, and extending to and engaging with the right cord connector attachable to the right side of a dog harness, and the proximal end of said right cord section extends away from the right cord connector; and
wherein when force away from the dog is exerted on the proximal end of said right cord section, inward pressure is exerted on the section of the right cord section encircling the dog's right hind leg.

11. The control harness of claim 10, additionally comprising a cord control member, wherein the proximal end of said left cord section is attached to the proximal end of said right cord section at the cord control member.

12. The control harness of claim 11, wherein the cord control member provides a pivot from which force away from the dog can exerted on the left cord section and the right cord section concurrently.

13. The control harness of claim 10, wherein said first extension strap uses a snap hook to removably engage a dog harness.

14. The control harness of claim 10, wherein said left hind connector is a circular ring apparatus, said distal end of the left cord section is permanently affixed to said left hind connector, and said left cord section re-engages said left hind connector by passing through the left hind connector circular ring.

15. The control harness of claim 10, wherein said right hind connector is a circular ring apparatus, said distal end of the right cord section is permanently affixed to said right hind connector, and said right cord section re-engages said right hind connector by passing through the right hind connector circular ring.

16. The control harness of claim 10, wherein said left cord connector comprises a snap hook attached to a circular ring apparatus, wherein the left cord connector is removably attached to the left side of a dog harness with the left cord connector snap hook and the left cord section engages said left cord connector by passing through the left cord connector circular ring.

17. The control harness of claim 10, wherein said right cord connector comprises a snap hook attached to a circular ring apparatus, wherein the right cord connector is removably attached to the right side of a dog harness with the right cord connector snap hook and the right cord section engages said right cord connector by passing through the right cord connector circular ring.

18. The control harness of claim 10, additionally comprising a left stopper, wherein the left stopper is engaged on the left cord section on the proximal side of the left cord connector, said left stopper being incapable of passing through the left cord connector, where the user can manually adjust the position of said left stopper along the left cord section on the proximal side of the left cord connector.

19. The control harness of claim 10, additionally comprising a right stopper, wherein the right stopper is engaged on the right cord section on the proximal side of the right cord connector, said right stopper being incapable of passing through the right cord connector, where the user can manually adjust the position of said right stopper along the right cord section on the proximal side of the right cord connector.

* * * * *